United States Patent
Lien et al.

(10) Patent No.: US 8,606,537 B2
(45) Date of Patent: Dec. 10, 2013

(54) SYSTEM AND METHOD FOR TESTING AN ELECTRONIC DEVICE

(75) Inventors: Tam Lien, Düsseldorf (DE); Thomas Ackermann, Köln (DE)

(73) Assignee: Vodafone Holding GmbH, Dusseldorf (DE)

( * ) Notice: Subject to any disclaimer, the term of this patent is extended or adjusted under 35 U.S.C. 154(b) by 518 days.

(21) Appl. No.: 12/830,111

(22) Filed: Jul. 2, 2010

(65) Prior Publication Data
US 2011/0054824 A1    Mar. 3, 2011

(30) Foreign Application Priority Data
Jul. 7, 2009 (DE) .......................... 10 2009 032 197

(51) Int. Cl.
*G01R 31/00* (2006.01)

(52) U.S. Cl.
USPC ......................................... 702/119; 702/122

(58) Field of Classification Search
USPC .................... 702/108, 119, 122–124
See application file for complete search history.

(56) References Cited

U.S. PATENT DOCUMENTS

| | | | |
|---|---|---|---|
| 6,128,008 A * | 10/2000 | Ogawa .......................... | 345/204 |
| 7,464,194 B2 * | 12/2008 | Saint-Hilaire et al. .......... | 710/11 |
| 7,526,410 B2 * | 4/2009 | Anastassopoulos et al. . | 702/186 |
| 2007/0178843 A1 * | 8/2007 | Singh et al. ................ | 455/67.11 |
| 2007/0198001 A1 * | 8/2007 | Bauch et al. ....................... | 606/1 |
| 2009/0031018 A1 * | 1/2009 | Conkright et al. ............. | 709/224 |
| 2010/0023383 A1 * | 1/2010 | Aaltonen et al. ................ | 705/10 |

* cited by examiner

*Primary Examiner* — Manuel L Barbee
(74) *Attorney, Agent, or Firm* — International IP Law Group, PLLC

(57) ABSTRACT

There is provided a system for testing an electronic device in a test arrangement. The test arrangement includes a data interface and a user interface that is configured to output user outputs comprising image and/or audio information. The exemplary system comprises an automation unit configured to be connected via a data connection to the data interface. The user outputs are provided as output via the data interface and can be transmitted via the data connection to the automation unit. The automation unit is configured to carry out an evaluation of the user outputs.

18 Claims, 3 Drawing Sheets

SYSTEM AND METHOD FOR TESTING AN ELECTRONIC DEVICE

CROSS REFERENCE TO RELATED APPLICATION

This application claims priority to German (DE) Patent Application No. 10 2009 032 197.7, filed Jul. 7, 2009, the contents of which are hereby incorporated by reference as if set forth in their entirety herein.

BACKGROUND

Electronic devices and the programs executed on them are often subjected to comprehensive tests in order to check that they are functioning properly. In the past, such function tests were largely performed manually in that an operator would operate the device that was to be tested or the devices that were contained in a test arrangement according to a prescribed test sequence. However, with the increasing complexity and functional diversity of electronic devices and the programs executed on them, manual function tests have become very personnel- and cost-intensive. Therefore, ways are being sought to perform tests in an automated testing process so as to reduce the time and cost investment needed for performing function tests. A challenge in the automation of device tests is especially that, to the greatest extent possible, the test arrangement should be operated during the testing operation in the same manner as a user would do during normal operation.

German patent application DE 10 2006 004 284 A1 describes a test method for a technical device having a user interface. In particular, this method is used to test mobile communication terminal devices such as, for example, mobile telephones. In order to perform the test, a control unit controls a robot means which acquires outputs from the device that is to be tested by means of a camera and a microphone. The acquired outputs are evaluated in the control unit for purposes of an automated acquisition of device functions. In order to operate the device that is to be tested, the robot means has actuation means, especially a tappet to actuate a keyboard of the device that is to be tested.

With this test method, the use of the robot means ensures that the operation during the testing conditions corresponds to the operation during normal conditions; however, providing the robot means is associated with a great deal of effort. After all, the robot means and the device that is to be tested have to be in the same place, and in particular, the robot means has to be mechanically adapted to the device that is to be tested.

SUMMARY

An exemplary embodiment of the present invention relates to the automation of tests of electronic devices. In this context, the subject innovation pertains to a system and to a method for testing an electronic device.

Therefore, an exemplary embodiment of the present invention may simplify the automated execution of device tests. In particular, devices that are contained in a test arrangement should be easy to connect to an automatic evaluation and/or control system in order to perform tests.

According to an exemplary embodiment of the invention, a system is proposed for testing an electronic device in a test arrangement that has a data interface and a user interface. The user interface is configured to output user outputs comprising video and/or audio information. The exemplary system comprises an automation unit that can be connected via a data connection to the data interface, whereby the user outputs can be output via the data interface and can be transmitted via the data connection to the automation unit. The automation unit is also configured to carry out an evaluation of the user outputs.

According to another aspect, an exemplary embodiment may provide a method for testing an electronic device in a test arrangement that has a data interface and a user interface. The user interface may be configured to output user outputs comprising image and/or audio information. Via a data connection, an automation unit is connected to the data interface, and the user outputs are output via the data interface and are transmitted via the data connection to the automation unit. The automation unit evaluates the user outputs.

The test arrangement comprises the electronic device that is to be tested. This device can comprise the above-mentioned data interface. However, the test arrangement can also comprise one or more additional electronic devices with which the device that is to be tested interacts during normal operation, that is to say, when no test is being performed. The data interface can also be a part of such an additional device. This can be, for instance, another electronic device with which the device that is to be tested can be configured or with which it can communicate in another manner. What applies to the data interface also applies to the user interface, which is a part of the same device. In an embodiment, the test arrangement can be a part of the system.

The term user outputs refers to the outputs that an electronic device, especially a computer means, outputs via a user interface to the user during normal operation. This can especially be information that is output by means of a display means of the electronic device, and this information can contain, for instance, pictures, videos and text. Likewise, audio information can be output to the user which comprises, for example, speech, music or prescribed tones or tone sequences. The audio information is output, for example, by means of a loudspeaker means of the electronic device. Furthermore, protocol data and interface data can be transmitted to the automation unit, this information being used for the evaluation of the test, in order to determine the correct functioning of the device that is to be tested.

The invention comprises the idea to output the user outputs in order to perform a test via a data interface and feeding the user outputs to an automation unit for evaluation. The possibility to output user outputs via a data interface is a standard feature of many electronic devices so that the devices can be operated by means of a remote computer means. Normally, providing user outputs in such a way is also referred to as a remote desktop. An advantage of the output of user outputs as a remote desktop relating to performing tests lies especially in the fact that existent functionalities can be used in order to access the user outputs. There is no need to create additional interfaces in order to perform the test. As a result, the adaptation of the automation unit to the test arrangement is facilitated, and it is ensured that the functioning of devices in the test arrangement is not changed due to the presence of additional interfaces and that no other special adaptations of a device have to be carried out, which could lead to a falsification of the test results. On the contrary, the devices contained in the test arrangement are operated in the same manner during the testing operation as they are during normal operation. The test logic is implemented in the automation unit. In this manner, especially realistic test conditions are ensured.

Within the scope of a remote desktop mechanism, user outputs can be output via the data interface instead of via the user interface, or else the user outputs are provided via the data interface in addition to the output via to the user interface. Therefore, in an embodiment of the invention, it is provided that user outputs can be redirected of the user interface to the data interface, or else a copy of the user outputs that have been output at the user interface can be made available via the data interface.

An embodiment of the invention provides that the automation unit is configured to carry out an evaluation of the user outputs on the basis of at least one procedure that has been selected from the group comprising image pattern recognition, text recognition and speech recognition. Advantageously, on the basis of such recognition procedures, a status of the device having the data interface can be determined that results, for example, due to an operating input or some other event.

An associated embodiment of the invention is characterized in that the automation unit is configured to generate an image sequence on the basis of received image information, and images contained in the image sequence can be utilized for the image pattern recognition and/or text recognition. In this manner, pattern recognition and/or text recognition methods can be used for images that are frequently used in other realms. Consequently, there is no need for an adaptation of the recognition method to the signals or to the format of the remote desktop output.

Furthermore, in an exemplary embodiment of the invention, it is provided that the image information comprises a graphic user interface of the electronic device having the data interface. On the basis of pattern recognition and/or text recognition, in particular, prescribed elements of the graphic user interface can be identified in order to determine the status of the electronic device. Moreover, it is also possible to recognize those elements of the graphic user interface that are used to operate the electronic device. An example of this is buttons in the graphic user interface.

In an exemplary embodiment, the user interface comprises at least one input device for generating control signals, and the automation unit is configured to generate corresponding control signals that can be transmitted via the data connection and that can be received via the data interface in order to influence the test arrangement. In particular, the device having the data interface and contained in the test arrangement is controlled in this process. The above-mentioned possibility for controlling an electronic device may be provided in the above-mentioned remote desktop mechanisms and can be used in an exemplary embodiment to operate one of the devices contained in the test arrangement. Here, the automation unit generates control signals that are similar to those that can be generated via the user interface of the device, so that the control signals of the automation unit can be interpreted and processed in the same manner as control signals of the user interface. An advantage of this refinement is again that there is no need to create additional interfaces in order to operate the device during the testing operation, as a result of the adaptation of the automation unit to the test arrangement is simplified and a falsification of the test results due to additional interfaces is prevented.

An exemplary embodiment of the invention comprises that a remote desktop connection is used in order to transmit the user outputs and/or the control signals generated by the automation unit. Advantageously, remote desktop mechanisms are implemented as a standard feature in many computers as components of the operating system, or they can easily be augmented by installing software. Such software is readily commercially available. Thus, at most, only very minor changes have to be made to the device that is to be tested in order to perform a test.

An exemplary embodiment of the invention comprises that the automation unit is configured to recognize prescribed user outputs on the basis of the evaluation of the user outputs, and that the automation unit is configured to compare the prescribed user outputs to expected user outputs and/or to generate a control signal for influencing the test arrangement as a function of a recognized user output. The control signals may control the electronic device. The expected user output can correspond to the output that, when the test arrangement is functioning properly, is provided as a result of an operating input or some other event. Therefore, a comparison of the received user output to the expected user output can serve to check that the device that is to be tested is functioning properly. Furthermore, as a result of a recognized user output, an operator action can advantageously be carried out at the device having the data interface in that a corresponding control signal is generated. Thus, for example, a button can be actuated after a window containing the button has opened in the graphic user interface of such a device.

In addition to the test of an individual electronic device, an exemplary embodiment may provide multi-system testing of electronic devices that interact with each other. For this purpose, user outputs from several electronic devices can be supplied to the automation unit. Moreover, a control of several electronic devices can be provided by the automation unit. The transmission of user outputs and/or the control of the devices can be carried out in the above-mentioned manner, especially via a remote desktop connection.

In one exemplary embodiment, the electronic device that is to be tested or another electronic device contained in the test arrangement has an additional user interface for outputting additional user outputs containing image and/or audio information, the system comprising an acquisition unit that is configured to acquire the user outputs that have been output by the additional user interface and to transmit them to the automation unit, the automation unit being configured to evaluate the additional user outputs. Advantageously, in this embodiment, an additional device can be integrated into the test arrangement, which does not have a remote desktop mechanism. Since the remote desktop mechanism is not present, user outputs of the additional device are acquired by means of an acquisition unit at the user interface of the device and transmitted by the acquisition unit to the automation unit. Here, in particular, a camera or the like can be used to acquire image information and a loudspeaker or the like can be used to acquire audio information. Advantageously, the user outputs that have been acquired by the acquisition unit can be fundamentally evaluated in the automation unit in the same manner as the remote desktop outputs. In particular, acquired image information can be evaluated in the same manner using pattern recognition and/or text recognition. For this purpose, image sequences can be generated from the images acquired with the camera. Hence, devices that do not have a remote desktop mechanism can easily be integrated into the test arrangement.

A related exemplary embodiment of the invention may be characterized in that the additional user interface comprises at least one input that can be mechanically or acoustically actuated by a user in order to control the device having the additional user interface, and an actuation means is provided that is configured to actuate the input means, the automation unit being configured to control the actuation device so as to control the device having the additional user interface. Advantageously, the actuation device makes it possible for the automation unit to operate an additional device that does not have a remote desktop mechanism.

An exemplary embodiment of the invention may provide the ability to test the interaction between the devices contained in the test arrangement. For this purpose, an exemplary embodiment of the invention provides for the automation unit to be configured to generate the control signals based on a user output of the electronic device having the additional user interface, and/or it provides for the automation unit to be configured to control the actuation device based on a user output of the device having the user interface.

In an exemplary embodiment of the invention, the additional electronic device may comprise a mobile communication terminal device such as, for example, a mobile phone or a PDA (personal data assistant). Such devices generally do not have a remote desktop mechanism. Advantageously, however, such devices can be integrated into the test arrangement in the above-mentioned manner in order to test their interaction with another device, especially a computer having a remote desktop mechanism. The actual device that is to be tested can be the communication terminal device.

According to another aspect, an electronic device may be tested by a method of the type described above. Moreover, an electronic device may be constructed identically to a device tested by the method described herein. Such a device has the property that a test result is associated with it that was obtained by a method of the type described above. The test of the device or of an identically constructed device can be performed, for example, before the device is marketed. On the basis of the tests, the proper functioning of the device can be ascertained. In this process, the device can also contain information about a successful test of the same device or of an identically constructed device that has been performed according to the method. This information can be accessed, for example, by a buyer so that confirmation of the proper functioning of the device is provided to him/her.

BRIEF DESCRIPTION OF THE DRAWINGS

Exemplary embodiments of the present invention are described herein with reference to the accompanying drawings, without this restricting the general inventive idea in any way whatsoever. The figures show the following.

DETAILED DESCRIPTION OF SPECIFIC EMBODIMENTS

Figure 1:
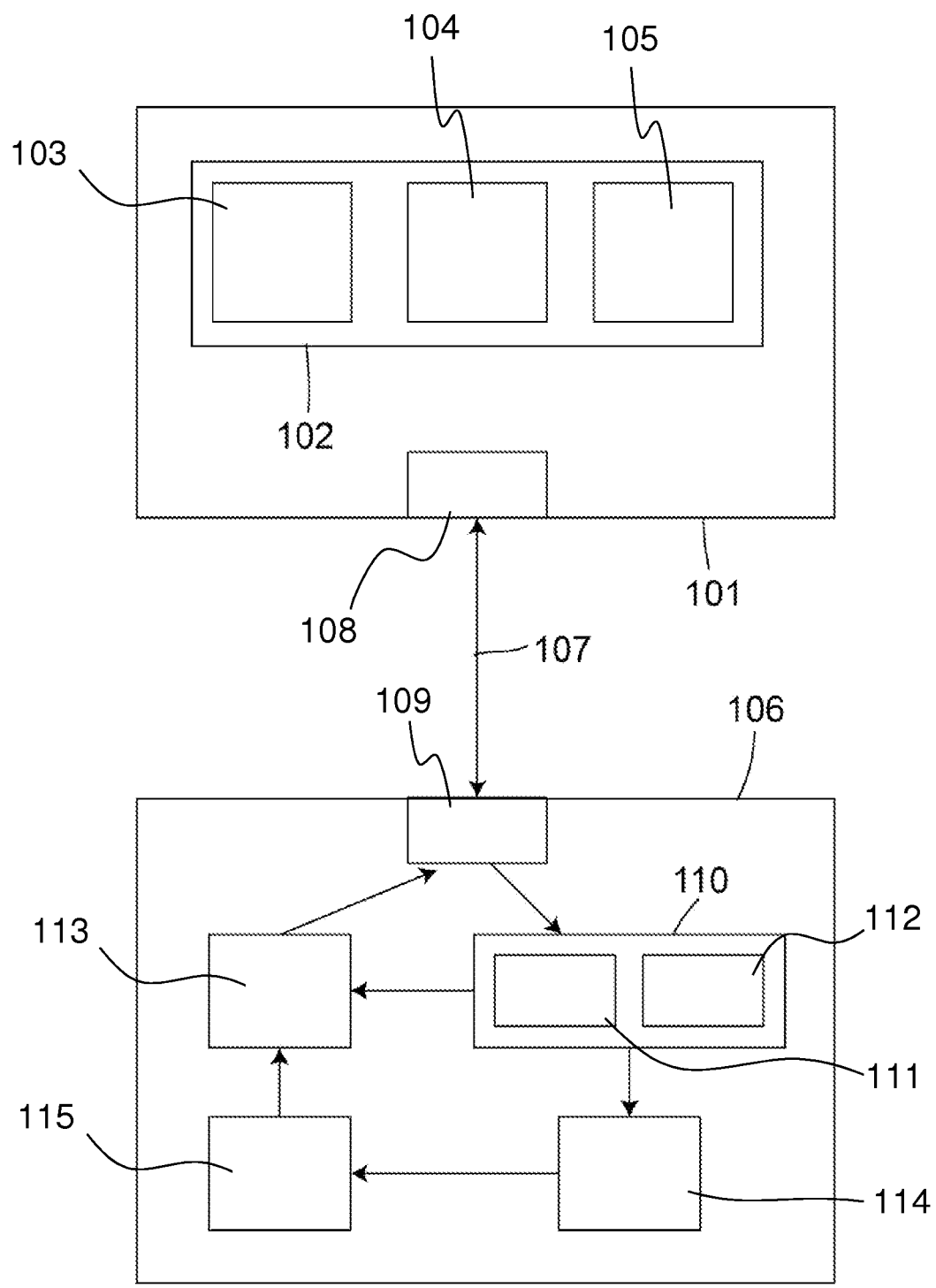
FIG. 1 is a block diagram of a system according to an exemplary embodiment of the present invention for testing a device that is to be tested.

FIG. 1 shows a schematic representation of a system for automatically testing a test arrangement including a computer 101, which is the device that is to be tested. In particular, programs executed on the computer 101 and the hardware of the computer 101 can be tested in an automated testing procedure. The computer 101 can be a PC, a server computer or a similar data processing unit for executing programs.

The computer 101 has a user interface 102, which allows a local user to interact with the computer 101. The user interface 102 preferably comprises a display 103 that can be configured as a display. The display 103 displays outputs of programs executed on the computer 101. This is preferably done within a graphic user interface (GUI). Moreover, the computer 101 can comprise, for example, an audio output 105 configured as a loudspeaker. The audio output 105 can output audio signals such as speech, music or prescribed sound patterns. The sound patterns can be, for instance, acknowledgement signals or warning signals.

Moreover, the user interface 102 comprises one or more input devices 104. These comprise, for example, an input device 104 used for navigating a pointer or a cursor within graphic user interfaces, as well as for performing operating actions such as, for instance, actuating a button. This input device 104, which will be referred to below as a pointing means, can be a computer mouse, a trackball or the like. Moreover, the computer 101 can allow speech inputs. For this purpose, a microphone for acquiring the speech inputs can be provided as another input device 104. A local user can use the input device 104 to generate inputs to control the computer 101 as well as the programs that are executed on the computer 101, and also in order to enter content such as, for example, written or spoken texts.

The user interface 102 serves especially for the user to use and control the computer 101 during normal operation, i.e. when no test is being performed. Therefore, the outputs of the computer 101, which can be output via the user interface 102, are also referred to here as user outputs. Accordingly, inputs that can be entered by a user via the user interface 102 are also referred to as user inputs.

During the testing operation, the computer 101 is controlled by an automation unit 106. This unit is in communication with the computer 101 via a data connection 107. The data connection 107 is preferably realized as a network connection that is established via a local network (LAN) or a wide area network (WAN) such as, for example, the Internet. Hence the computer 101 can be arranged at any desired physical distance from the automation unit 106. However, the data connection 107 can likewise be configured in any other manner known to the person skilled in the art, for instance, as a connection via a data cable, a radio connection or the like. As far as the computer 101 is concerned, the data connection 107 is established via a data interface 108 that especially sends and receives data according to the data transmission protocols that have been provided for the data connection 107. For this purpose, a remote interface 109 is available in the computer 101. This is fundamentally a data interface of the automation unit 106, which is referred to as a remote interface 109, specifically in order to distinguish it terminologically from the data interface 108 of the computer 101.

The computer 101 has a mechanism that outputs user outputs, especially the graphic user interface as well as audio signals, via the data interface 108 so that they can be sent via the data connection 107. Likewise, the mechanism makes it possible to receive inputs via the data interface 108 that correspond to local user inputs entered via the input device(s) 104. On the basis of the mechanism, outputs of the user interface 102 can be redirected to the data interface 108, or else a copy of the outputs can be made available at the data interface 108. Likewise, the control of the computer 101 can be relocated from the input device(s) 104 to the data interface 108, or else inputs can be made via the input device(s) 104 as well as via the data interface 108. Such a mechanism is also referred to as a remote desktop mechanism, and it is a standard feature in many computers within the operating system. Thus, for example, the widespread Windows operating system made by the Microsoft Corporation makes the Remote Desktop Protocol (RDP) available, which provides a remote desktop mechanism.

In the automation unit 106, the user outputs are received via the remote interface 109. In order to perform automated tests, the received user outputs are automatically evaluated in the automation unit 106. In this process, graphic user outputs, i.e. especially the graphic user interface of the computer 101, are evaluated, preferably on the basis of an image or video evaluation. Therefore, on the basis of the received graphic user outputs, the remote interface 109 generates an image sequence that can be configured as a sequence of individual images or as a video sequence. The generated image sequence is then transferred to an evaluation unit 110 of the automation unit 106. The image sequence can contain, for example, images or video sequences in a format known to the person skilled in the art. For this purpose, the graphic user outputs received via the remote interface 109 can be converted into the prescribed format or else generated in the prescribed format. Consequently, the generated image sequence corresponds to a sequence of so-called screenshots of the graphic user interface of the computer 101, said sequence having been generated in the automation unit 106. As an alternative, it can also be provided that the images are already generated in the computer 101 by an internal mechanism of the computer 101 and that these images are transmitted via the data connection 107 to the automation unit 106. Audio signals received via the remote interface 109 are likewise transferred to the evaluation unit 110.

The graphic user outputs of the computer 101 show the operating status of programs that are being executed on the computer 101. In particular, reactions to user inputs or other events are shown. Furthermore, the graphic user interface contained in the graphic user outputs normally comprises control areas that can be actuated on the basis of user inputs in order to control the program. In order to determine the operating statuses or reaction of a program, and in order to recognize control areas, the evaluation unit 110 has a graphic component 111 in which pattern recognition is carried out. The pattern recognition preferably comprises an identification of patterns and a determination of their position within the graphic user interface. The shape, size, color, position and similar properties can be used to identify image patterns. During a learning and training phase, the evaluation unit 110 learns the patterns that are relevant for performing the prescribed tests. Fundamentally, any method that is suitable and known to the person skilled in the art can be used for this pattern recognition. Moreover, the textual content of the received graphic output of the computer 101 is acquired and recognized by means of optical character recognition (OCR). The text recognition also preferably involves a determination of the text content and of the position of the text. In this process, the positions of text constituents and image patterns can be compared to each other, for example, in order to reliably identify written buttons of the graphic user interface.

Audio outputs of the computer 101 received via the remote interface 109 are evaluated in an audio component 112 of the evaluation unit 110. Prescribed sound patterns can be recognized in the audio component 112. As explained above, these can be, for example, acknowledgement tones or warning tones. Moreover, speech recognition can be carried out in which words contained in the audio outputs can be identified and acquired in a form that can be further processed by machine.

Moreover, the automation unit 106 has a control unit 113 that is configured to control programs executed on the computer 101. The control is carried out on the basis of the remote desktop mechanism in that control signals generated in the control unit 113 are transferred to the remote interface 109 of the automation unit 106. The control commands are sent via the data connection 107 from the remote interface 109 to the computer 101.

In order to be able to use the remote desktop mechanism to control the computer 101, the control unit 113 generates control signals that correspond to user inputs of the kind that can be generated by a user by means of the user interface 102, especially by means of the contained input means 104. Consequently, the computer 101 interprets the control signals received via the data interface 108 in the same manner as control signals that have been generated by means of the input means 104. The generation of the control signals in the control unit 113 thus comprises an emulation of control signals that can be generated with the input means 104 of the computer 101. Preferably, a script language is used to generate the control signals such as, for example, the script language AutoIT, which is especially suitable for simulating keystrokes and mouse clicks.

If a keyboard is provided as the input means 104 to control programs executed on the computer 101, then corresponding keyboard signals are generated by the control unit 113. If a program can be operated alternatively or additionally by means of a pointing means, then corresponding control signals are likewise generated by the control means 113. These are control signals for moving the pointer or the cursor to a certain position within the graphic user interface or else they are control signals that correspond to other operating actions that can be executed by the pointing means such as, for example, a mouse click and/or supplemental keystrokes. In this manner, especially buttons within a graphic user interface can be actuated. In order to determine positions within the graphic user interface, the control unit 113 uses the results of the evaluation that was performed by the graphic component 111 of the evaluation unit 110 in order to identify elements of the graphic user interface and in order to determine their position. On the basis of the results of this evaluation, the control unit 113 can determine how a pointer or cursor has to be moved in order to touch a specific element of the graphic user interface. In order to be able to make a speech input that might be provided at the computer 101, the control unit 113 can have a speech synthesizer with which corresponding speech inputs can be generated.

An evaluation of reactions of the computer 101 or of a program that is to be tested and that is executed on the computer 101 can be carried out by an evaluation unit 114 of the automation system 106. For this purpose, the results of the evaluation carried out by the evaluation unit 110 are fed to the evaluation unit 114. In other words, the ascertained patterns and recognized text, along with the appertaining positions and acquired sound patterns and speech outputs, are indicated. The evaluation unit 114 then compares the acquired user outputs with prescribed user outputs or checks whether prescribed user outputs have been received. First of all, this serves to evaluate the performed test. Thus, the evaluation unit 114 can, for example, create a log indicating whether and when a program that is to be tested has produced an expected reaction to a control signal or to a specific event. This provides information about whether or not the computer 101 or a program executed on the computer 101 has behaved as expected and properly during the test. Furthermore, protocol data and interface data can also be transmitted by the computer 101 via the remote interface, said data being evaluated and logged in the evaluation unit 114 in order to provide information about the correct functioning of the computer 101 or about any errors that might have occurred. Secondly, as a function of the acquisition of a certain user output, control signals can be generated by the control unit 113. Thus, via the evaluation unit 114, for example, it is possible to determine that a certain window has opened in the graphic user interface in which operating inputs are then made by means of the control unit 113.

The test of the computer 101 is carried out by the automation unit 106 according to a prescribed test routine in which test steps that are to be performed and their sequence are defined. Before the test, the test routine is stored in the automation unit 106 and its execution is controlled by a test logic 115. The test logic 115 instructs the control unit 113 to generate the control signals required in the test routine. In this process, the test logic 115 also accesses the evaluation of the user outputs of the computer 101 that had been carried out in the evaluation unit 114 in order to instruct the control unit 113 to generate a prescribed control signal, for example, if a user output specified in the test routine occurs. Here, as explained above, for example, a prescribed control signal can be generated once a prescribed window has opened in the graphic user interface.

Figure 2:
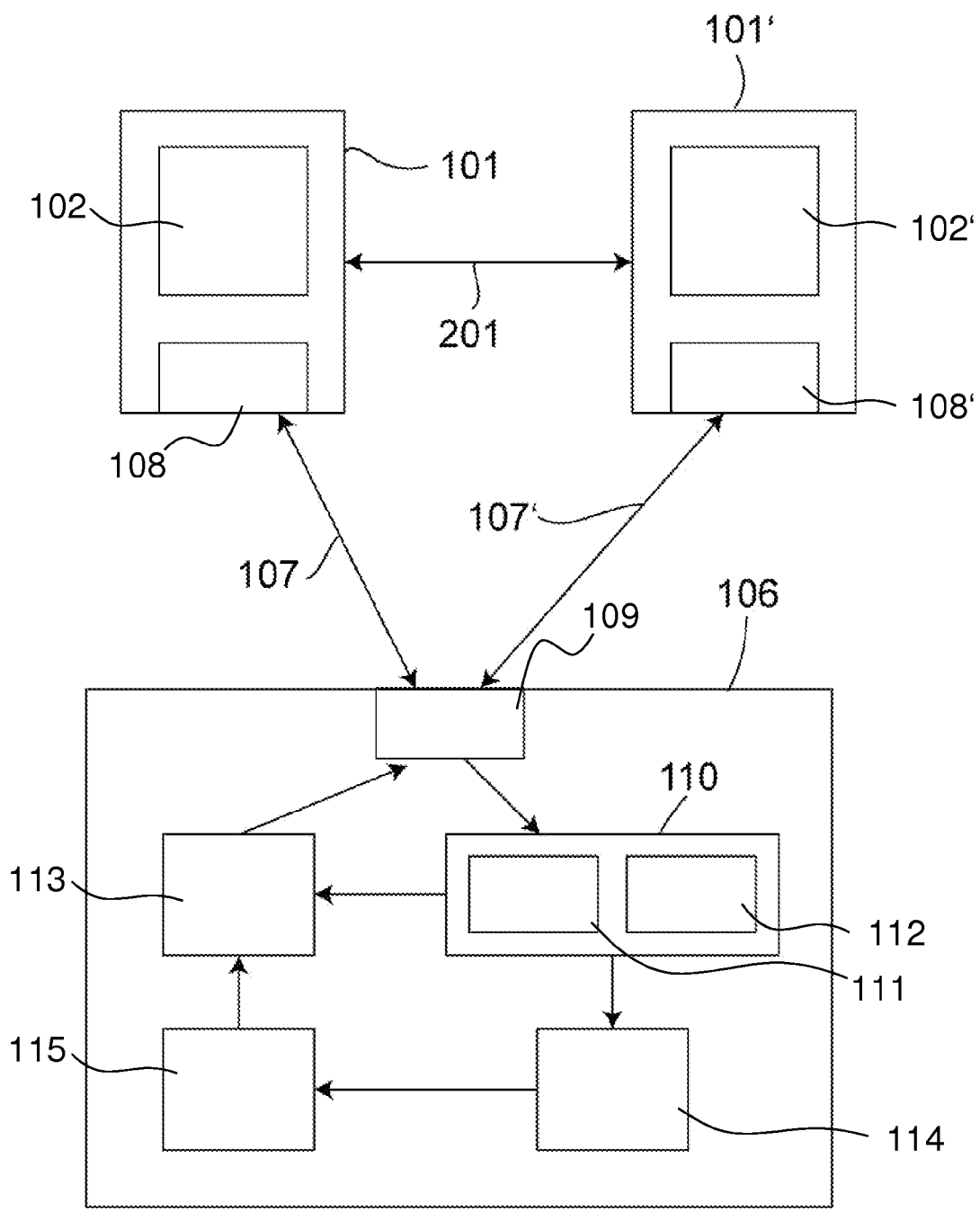
FIG. 2 is a block diagram of a system according to an exemplary embodiment of the present invention for testing two devices that are to be tested.

In the manner described above, programs that are executed on an individual computer 101 can be tested. As shown in FIG. 2, however, it is likewise possible to connect several computers 101, 101' to the automation unit 106, especially computers 101, 101' that interact with each other. The performed test can serve to test the function of one or more computers contained in the test arrangement. In the embodiment shown, two computers 101, 101' are provided which are fundamentally likewise configured in the manner described above. The depicted computers 101, 101' each have a user interface 102, 102' to output user outputs and to acquire user inputs, said user interface 102, 102' being configured in the manner described above. Moreover, a remote desktop mechanism is implemented in both computers 101, 101' so that user outputs can be transmitted via a data interface 108, 108' and a data connection 107' to the automation unit 106, and so that emulated user inputs generated in the automation unit 106 can be received.

The devices that are to be tested 101, 101' interact via another data connection 201 that can be established via a network or in any other manner known to the person skilled in the art. The two computers 101, 101' interact in such a way that a user input at a computer 101, 101' results in a reaction at the other computer 101, 101'. For example, the one computer 101, 101' can be a server computer and the other computer 101, 101' can be a client computer that uses services of the server computer. A service configuration can be established on the server computer that determines how the service is provided on the client computer. The service can comprise executing a program, providing a website or the like. As an alternative, there can be two computers 101, 101' between which users can establish a communication connection that can be used, for example, for the transmission of audio information, text information and/or image information.

The automation unit 106 can be used to test the computer 101, 101' or one of the computers 101, 101', especially in terms of the interaction between the computers 101, 101'. Here, the user outputs of both computers 101, 101' are evaluated and assessed in the automation unit 106 in the manner described above. Moreover, both computers 101, 101' are controlled on the basis of control signals generated in the automation unit 106 in the manner described above, and these control signals are received in the computers 101, 101' via the data interfaces 108, 108'.

Since the automation unit 106 has access to the two computers 101, 101', however, reactions of a computer 101, 101' to user inputs can also be acquired and evaluated at the other computer 101, 101'. Thus, for instance, it is possible to test how changes in the service configuration in a server means affect the provision of the service at the client means, or else it is possible to test the transmission of information via a communication connection between the computers 101, 101'. For this purpose, audio information and/or text information can be generated by the automation unit 106 for test purposes.

Thus, the automation unit 106 can be utilized to test the interaction between several computers 101, 101'. The computers 101, 101' can be located in different places and the automation unit 106 can be operated at another place. In this manner, a company, for example, can use a central automation unit 106 to test remote computers 101, 101' and their interaction.

Figure 3:
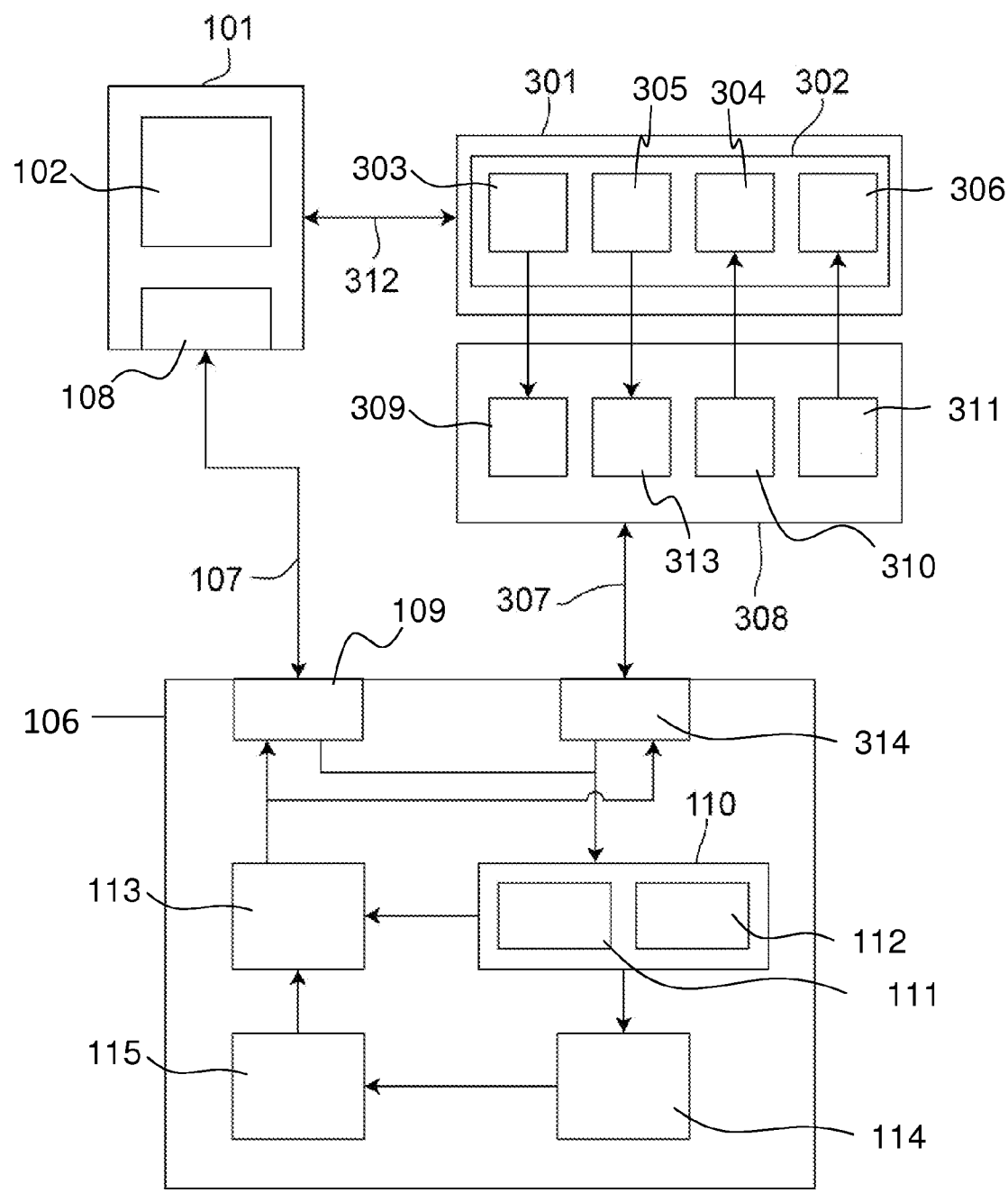
FIG. 3 is a block diagram of a system according to an alternative exemplary embodiment of the present invention for testing two devices that are to be tested.

FIG. 3 shows a test arrangement that is connected via the automation unit 106 and that likewise comprises several devices 101, 301 that interact with each other. The one device 101 is again configured as a computer with a user interface 102 of the type described above in order to output user outputs and to acquire user inputs. Moreover, a remote desktop mechanism is implemented in the device 101, so that user outputs can be transmitted to the automation unit 106 via a data interface 108 and a data connection 107, and control signals that have been generated in the automation unit 106 and that correspond to user inputs can be received in order to control the device 101.

The second device 301 likewise has a user interface 302 comprising a display device 303 that can be configured as a display. The display device 303 displays outputs of programs executed on the device 301, preferably in a graphic user interface. Moreover, the device 301 can have an audio output 305 configured, for example, as a loudspeaker. Audio signals such as speech, music or prescribed sound patterns can be output via the audio output 305. The sound patterns can, once again, be acknowledgement signals or warning signals.

Moreover, the device 301 has an input 304 comprising a keyboard. Preferably, the input 304 also has a pointing device for navigating a pointer or a cursor within a graphic user interface and for executing operating actions such as, for example, actuating a button. The pointing device can be integrated into the keyboard or configured as an autonomous unit. Moreover, the device 301 can allow speech inputs. For this purpose, an audio input 306 is provided which can be configured as a microphone for recording speech inputs of a local user.

In contrast to the computer 101, however, the device 301 does not have a remote desktop mechanism. An example of such a device 301 is a mobile communication terminal device such as a mobile telephone, a PDA (personal data assistant) or the like. Other examples are digital cameras, navigation devices, game consoles and medical devices that are equipped with a user interface 302 of the type described above but that do not have a remote desktop mechanism.

The computer 101 and the device 301 are connected to each other via a data connection 312. This connection can again be established via a network or in another manner known to the person skilled in the art. If the device 301 is a mobile communication terminal device, the connection can especially be established via a mobile communication network to which the device 301 is connected. The computer 101 and the device 301 interact in such a manner that a user input at the computer 101 results in a reaction at the other device 301 and/or vice versa.

For example, in the arrangement shown in FIG. 3, the computer 101 can also be configured as a server means that provides a service that is called up by the device 301. In particular, this can be a JAVA server, and the device 301 can be configured as a JAVA-capable communication terminal device on which a JAVA application is executed that is provided by the JAVA server. Likewise, a communication connection can be established between the computer 101 and the device 301, for example, a Voice-over-IP connection between a mobile communication terminal device and a computer. In these scenarios, it is possible, for example, to test how changes in the service configuration in a JAVA server affect the provision of JAVA applications at a mobile communication terminal device, or else it is possible to test the transmission of information via a communication connection between a mobile communication terminal device and a computer. Likewise, the device 301 can be a terminal device which can be configured by the computer means 101, or in which other inputs can be made via the computer 101. Mobile communication terminal devices can often be configured by a computer 101, and mobile communication terminal devices can be used to send messages that are generated on a connected computer 101. This functionality can likewise be tested with the test arrangement shown here.

In the test arrangement shown in FIG. 3, the performed test can relate to the functioning of the computer 101 as well as to the functioning of the device 301. Likewise, the functioning of the computer 101 or of the device 101 can be tested, if, for example, the correct functioning is known for the devices 101, 301 which have not been tested. Thus, it is possible to test whether a new communication terminal device interacts correctly with a computer 101 of the type described above.

Owing to the absence of a remote desktop mechanism, a robot device 308 is provided for acquiring user outputs of the device 301 and for entering user inputs. This robot device 308 has a camera 309 that serves to acquire images of the display device 303 and that is positioned accordingly. Moreover, an audio acquisition unit 313 configured as a microphone can be provided so that audio outputs of the audio output device 305 of the device 301 can be acquired. Moreover, the robot 308 is capable of actuating the input 304. For this purpose, the robot 308 has a mechanical actuation device 310 that comprises one or more tappets for actuating a keyboard and/or a pointing device. Moreover, a loudspeaker 311 of the robot 308 can generate audio inputs at the audio output device 305 of the device 301. An example of such a robot 308 that can be used within the scope of the present invention is disclosed in DE 10 2006 004 248 A1, to which reference is made in order to further explain the functionalities described above.

The robot 308 is connected to the automation unit 106 via a data connection 307 with which an interface 314 is associated by the automation unit. The connection can be established via a network if the robot 308 is arranged remotely from the automation unit 106. Likewise, it can be provided that the robot 308 and the automation unit 106 are in the same location. In this case, a direct data connection 307, for example, a cable-based connection, can exist between the robot 308 and the automation unit 106.

The user outputs of the device 301, which have been acquired by the robot 308, are transmitted to the automation unit 106 via the data connection 307. Within the automation unit 106, the user outputs are transferred to the evaluation unit 110.

Then, the graphic user outputs of the display means 303 are evaluated using the graphic component 111 of the evaluation unit 110. This evaluation is carried out in a manner that is analogous to the evaluation of graphic user outputs that are received within the scope of a remote desktop mechanism via the remote interface 109 in the automation unit 106. This is possible since the camera 309, like the remote interface 109, provides image sequences that can be evaluated by the graphic component 111 of the evaluation unit 110 on the basis of the same pattern recognition and text recognition. Thus, in terms of graphic user outputs of the device 301, only an adaptation to the special device 301 or to a program executed on the device 301 is needed, as is also required with respect to the computer 101.

Audio outputs of the device 301 that have been acquired by the loudspeaker means 311 of the robot 308 are evaluated in the audio component 112 of the evaluation unit 110. This evaluation is likewise carried out in the same manner as the evaluation of audio outputs that are received via the remote interface 109 by the device 101 in the automation unit 106. The results of the evaluation of the user outputs of the device 301, which is carried out in the evaluation unit 110, are transferred to the evaluation unit 114 in the manner already described above.

In order to control the device 301, the control unit 113 of the automation unit 106 generates control commands for actuating the actuation device 310. This takes place analogously to the generation of control signals that are sent via the remote interface 109 to the computer 101. In order to control the robot 308, however, no control signals are emulated that can be generated by the input device 104 of the device 301, but rather control commands that are adapted to the actuation device 310. The control commands are transmitted via the data connection 307 to the robot 308. The latter moves the actuation device 310 based on the control commands in order to actuate the input device 304. Insofar as necessary to actuate a control surface of a graphic user interface of a program of the device 301, as described above, the evaluation of the graphic user outputs of the device 301 can be accessed in order to generate the control commands in order to determine the position of the control surface and in order to control the actuation device 310 accordingly.

Moreover, the control unit 133 can generate audio signals that that are transmitted via the data connection 307 to the robot 308 and are output via the loudspeaker 311. The device 301 acquires these audio signals as speech inputs via the audio input device 306.

User outputs of the computer 101 are received in the automation unit 106 via the remote interface 109 and evaluated and assessed in the manner described above. Moreover, the computer 101 is controlled with the control unit 113 via the remote interface 109 in the manner described above.

According to a prescribed test routine, the control unit 113 receives instructions from the test logic 115 for generating control signals for controlling the computer 101 and control commands for controlling the robot 308. Here, control signals for controlling the computer 101 can be generated based on determined operating statuses of the device 301, and control commands for controlling the robot 308 can be generated based on determined operating statuses of the device 301.

In the manner described above, the devices 101, 301 can especially be tested if an error has occurred, in order to determine the cause of the error. Moreover, the devices 101, 301 can be checked for proper functioning before being sold or introduced onto the market. If the devices 101, 301 are sold in large numbers, as is usually the case, for example, with communication terminal devices, then the test can also be restricted to one or more selected devices, since a test of all of the manufactured devices would involve too much effort. In this case, however, the function of identically constructed devices can also be determined with a high degree of reliability.

Although the invention was described in detail in the drawings and in the description above, the presentations are to be understood as being illustrative and exemplary, and not restrictive; in particular, the invention is not limited to the explained embodiments. Other variants of the invention and its execution can be gleaned by the person skilled in the art from the preceding disclosure, the figures and the claims.

The terms used in the claims such as "comprise", "have", "contain", "encompass" and the like do not preclude other elements or steps. The use of the indefinite article does not rule out a plural. An individual means can perform the functions of several units or means cited in the claims.

The reference numerals indicated in the claims are not to be seen as a restriction in the means and steps employed.

What is claimed is:

1. A system for testing an electronic device in a test arrangement including a data interface and a user interface wherein the user interface comprises at least one input device for generating control signals, the system is configured to output user outputs comprising image and/or audio information, the system comprising:
   an automation unit configured to be connected via a data connection to the data interface, wherein the user outputs are provided as output via the data interface and can be transmitted via the data connection to the automation unit, the automation unit being configured to carry out an evaluation of the user outputs, and the automation unit being further configured to generate control signals corresponding to control signals generated via the user interface of the device, which generated control signals can be transmitted to the data interface via the data connection in order to influence the test arrangement by controlling the electronic device.

2. The system recited in claim 1, wherein the user outputs of the user interface are configured to be redirected to the data interface, the user outputs being further configured such that a copy of the user outputs that have been output at the user interface can be made available via the data interface.

3. The system recited in claim 1, wherein the automation unit is configured to carry out an evaluation of the user outputs on the basis of at least one procedure that has been selected from the group comprising image pattern recognition, text recognition and speech recognition.

4. The system recited in claim 3, wherein the automation unit is configured to generate an image sequence on the basis of received image information, and images contained in the image sequence can be utilized for the image pattern recognition and/or text recognition.

5. The system recited in claim 1, wherein the image information comprises a graphic user interface.

6. The system recited in claim 1, wherein a remote desktop connection is used to transmit the user outputs and/or the control signals generated by the automation unit.

7. The system recited in claim 1, the automation unit being configured to recognize prescribed user outputs on the basis of the evaluation of the user outputs, the automation unit being further configured to compare the prescribed user outputs to expected user outputs and/or to generate a control signal for influencing the test arrangement as a function of a recognized user output.

8. The system recited in claim 1, wherein an electronic device that is to be tested has an additional user interface for outputting additional user outputs containing image and/or audio information, the system comprising an acquisition unit that is configured to acquire the user outputs that have been output by the additional user interface and to transmit them to the automation unit, the automation unit being configured to evaluate the user outputs.

9. The system recited in claim 8, wherein the additional user interface comprises at least one input device that can be mechanically or acoustically actuated by a user in order to control the device having the additional user interface, and an actuation device is provided that is configured to actuate the input device, the automation unit being configured to control the actuation device so as to control the device having the additional user interface.

10. The system recited in claim 9, wherein the automation unit is configured to generate the control signals based on the determined operating status of the electronic device having the additional user interface, wherein the automation unit is configured to control the actuation device based on the determined operating status of an electronic device having the user interface.

11. The system recited in claim 8, wherein the electronic device having the additional user interface is a mobile communication terminal device.

12. A method for testing an electronic device in a test arrangement including a data interface and a user interface, wherein the user interface comprises at least one input device for generating control signals, the method comprising:
   configuring the user interface to output user outputs comprising image and/or audio information; connecting an automation unit via a data connection to the data interface;
   delivering the user outputs as output via the data interface, the user outputs being transmitted via the data connection to the automation unit;
   evaluating the user outputs with the automation unit; and
   generating by means of the automation unit control signals corresponding to control signals generated via the user interface of the device, which generated control signals are transmitted via the data connection to the data interface in order to influence the test arrangement by controlling the electronic device.

13. The method recited in claim 12, comprising redirecting the user outputs from the user interface to the data interface, or making available via the data interface a copy of the user outputs that have been outputted at the user interface.

14. The method recited in claim 12, comprising transmitting the user outputs and/or the control signals generated by the automation unit via a remote desktop connection.

15. An electronic device in a test arrangement including a data interface and a user interface, wherein the user interface comprises at least one input device for generating control signals, the electronic device being tested by configuring the user interface to output user outputs comprising image and/or audio information; connecting an automation unit via a data connection to the data interface, delivering the user outputs as output via the data interface, the user outputs being transmitted via the data connection to the automation unit, and evaluating the user outputs with the automation unit, and the electronic device being arranged to be controlled by means of control signals corresponding to control signals generated via the user interface of the device, which control signals are generated by the automation unit and said control signals being transmitted to the data interface via the data connection in order to influence the test arrangement.

16. The electronic device recited in claim 15, wherein the user outputs of the user interface are configured to be redirected to the data interface, the user outputs being further configured such that a copy of the user outputs that have been output at the user interface can be made available via the data interface.

17. The electronic device recited in claim 15, wherein the automation unit is configured to carry out an evaluation of the user outputs on the basis of at least one procedure that has been selected from the group comprising image pattern recognition, text recognition and speech recognition.

18. The electronic device recited in claim 15, wherein the automation unit is configured to generate an image sequence on the basis of received image information, and images contained in the image sequence can be utilized for the image pattern recognition and/or text recognition.

\* \* \* \* \*